(12) United States Patent
Barnett

(10) Patent No.: US 11,828,581 B1
(45) Date of Patent: Nov. 28, 2023

(54) MOLDED ARROW ASSEMBLY

(71) Applicant: David A. Barnett, Tarpon Springs, FL (US)

(72) Inventor: David A. Barnett, Tarpon Springs, FL (US)

(73) Assignee: BARNETT OUTDOORS, LLC

( * ) Notice: Subject to any disclaimer, the term of this patent is extended or adjusted under 35 U.S.C. 154(b) by 0 days.

(21) Appl. No.: 18/221,448

(22) Filed: Jul. 13, 2023

Related U.S. Application Data

(60) Provisional application No. 63/407,768, filed on Sep. 19, 2022.

(51) Int. Cl.
*F42B 6/04* (2006.01)
*F42B 6/08* (2006.01)
*B29C 45/14* (2006.01)

(52) U.S. Cl.
CPC ............... *F42B 6/08* (2013.01); *B29C 45/14* (2013.01); *F42B 6/04* (2013.01)

(58) Field of Classification Search
CPC .................................... F42B 6/04; F42B 6/08
See application file for complete search history.

(56) References Cited

U.S. PATENT DOCUMENTS

| | | | | |
|---|---|---|---|---|
| 5,443,272 A | * | 8/1995 | Vincent, Sr. | F42B 6/04 473/578 |
| 6,554,725 B1 | * | 4/2003 | Schaar | F42B 6/04 473/578 |
| 7,077,770 B2 | * | 7/2006 | Palomaki | F42B 6/04 473/578 |
| 8,157,680 B2 | * | 4/2012 | Anderson | B29C 45/14467 473/578 |
| 9,638,499 B2 | | 5/2017 | Perry | |
| 10,859,354 B1 | | 12/2020 | Huang | |
| 11,098,994 B1 | | 8/2021 | Huang | |
| 2006/0281593 A1 | * | 12/2006 | Young | F42B 6/04 473/578 |
| 2017/0052007 A1 | * | 2/2017 | Syverson | F42B 6/04 |
| 2017/0067723 A1 | * | 3/2017 | Pedersen | B29C 45/0013 |

* cited by examiner

*Primary Examiner* — John A Ricci
(74) *Attorney, Agent, or Firm* — Donald J. Ersler

(57) ABSTRACT

A molded arrow assembly preferably includes an insert and an outsert for an arrow or an insert/outsert assembly. The molded arrow assembly may include an insert having a cylindrical body with a first end and a second end. The second end may be dimensioned to fit within a bore of an arrow shaft. The first end may terminate in a prong containing male threads. The insert/outsert assembly may also include an outsert having a cylindrical wall with an arrow shaft end and an arrowhead end. The cylindrical wall may also include a center bore extending between the arrow shaft end and the arrowhead end. The center bore may contain a threaded region containing female threads. The threaded region may be located intermediate of the arrowhead end and the arrow shaft end and may extend between a top shoulder and a bottom shoulder.

4 Claims, 9 Drawing Sheets

MOLDED ARROW ASSEMBLY

CROSS-REFERENCES TO RELATED APPLICATIONS

This is a non-provisional patent application which claims the benefit of provisional patent application No. 63/407,768, filed on Sep. 19, 2022.

BACKGROUND OF THE INVENTION

Field of the Invention

The present invention relates generally to archery and more specifically to a process of creating assemblies for arrows.

Discussion of the Prior Art

U.S. Pat. No. 9,638,499 to Perry, which is assigned to Barnett Outdoors discloses an insert/outsert assembly for an arrow, and is hereby incorporated by reference into this application in its entirety. Perry discloses an insert/outsert for an arrow combining the elements of external threads of an insert/outsert engageable with the internal threads of an arrow tip or broad head. U.S. Pat. No. 10,859,354 to Huang discloses an arrow insert with threaded stem for retaining an arrow tip. U.S. Pat. No. 11,098,994 to Huang discloses an arrow insert with threaded stem for retaining an arrow tip for engagement with a broad head. Huang requires that the neck, or shank, of the threaded insert be sized to be inserted into an inner perimeter of an arrow shaft, and a bonding substance applied to the shank to retain the shank in the arrow shaft. All of the above prior art references rely on the use of an arrow shaft, which is a hollow tube of materials known in the art. The manufacturing process for the prior art is laborious and expensive. There is a need to provide an inexpensive arrow having external threads to engage an arrow tip or broad head, and an arrow manufacturing process that will provide the same.

Accordingly, there is a clearly felt need in the art for a molded arrow assembly, which provides a more cost-effective arrow and includes a manufacturing process for the same.

SUMMARY OF THE INVENTION

Embodiments of the invention include and insert and outsert for an arrow or an insert/outsert assembly. The insert/outsert assembly may include an insert having a cylindrical body with a first end and a second end. The second end may be dimensioned to fit within a bore of an arrow shaft. The first end may terminate in a prong containing male threads. The insert/outsert assembly may also include an outsert having a cylindrical wall with an arrow shaft end and an arrowhead end. The cylindrical wall may also include a center bore extending between the arrow shaft end and the arrowhead end. The center bore may contain a threaded region containing female threads. The threaded region may be located intermediate of the arrowhead end and the arrow shaft end and may extend between a top shoulder and a bottom shoulder. The female threads of the threaded region may be threadably connectable to the male threads of the prong.

In an embodiment, the insert may include a radially extending flange positioned at the first end below the prong. The radially extending flange may have an upper edge that receives and supports an arrowhead shoulder of an arrowhead. The radially extending flange may also have a bottom edge that contacts a terminal end of an arrow shaft.

In an embodiment, the outer surface of the second end of the insert includes a plurality of pockets. The plurality of pockets may be dimensioned to receive a glue.

In an embodiment, the arrow shaft end of the cylindrical wall of the outsert may be tapered. The arrow shaft end of the cylindrical wall of the outsert may be tapered inwardly.

In an embodiment, the center bore of the outsert may contain an arrowhead adapter chamber positioned above the threaded region. The arrowhead adapter chamber may be dimensioned to accommodate an arrowhead adapter section of an arrowhead. The center bore of the outsert may contain an arrow shaft chamber positioned below the threaded region. The arrow shaft chamber may be dimensioned to accommodate a terminal end of the arrow shaft.

In an embodiment, the insert/outsert assembly also includes an arrowhead. The arrowhead may include an arrowhead adapter section with an extension member containing male threads for threaded connection to the female threads of the threaded region of the outsert. The arrowhead adapter section may include an arrowhead shoulder that contacts a top edge of the arrowhead adapter chamber.

In another embodiment an assembly for an arrow is provided that includes an insert having a cylindrical body with a first end and a second end. The second end may be dimensioned to fit within a bore of an arrow shaft. The first end may terminate in a prong containing male threads. The assembly may include an arrowhead including an upper target penetrating section and a lower insert connecting section. The lower insert connecting section may include a bottom wall section containing an interior bore that terminates at a threaded region section. The threaded region section may include female threads for connecting with the male threads of the prong of the insert.

In an embodiment, the upper target penetrating section may be a broad head or a practice point.

In an embodiment, the bottom wall section may be tapered. The bottom wall section may be tapered inwardly.

Embodiments of the invention also include a method of assembling an arrow. The method may include the step of providing an insert/outsert assembly comprising: an insert having a cylindrical body with a first end and a second end, the second end dimensioned to fit within a bore of an arrow shaft, the first end terminating in a prong containing male threads; an outsert having a cylindrical wall with an arrow shaft end and an arrowhead end, a center bore extending between the arrow shaft end and the arrowhead end, the center bore containing a threaded region containing female threads, the threaded region located intermediate of the arrowhead end and the arrow shaft end and extending between a top shoulder and a bottom shoulder, the female threads of the threaded region being threadably connectable to the male threads of the prong. The method may also include the step of inserting the second end of the insert into the bore of the arrow shaft. The method may also include the step of threadably connecting the outsert to the insert.

In an embodiment, the method may include the step of gluing the second end of the insert to an internal bore wall of the arrow shaft.

In an embodiment, the method may include the step of providing an arrowhead, the arrowhead including an arrowhead adapter section with an extension member containing male threads for threaded connection to the female threads of the threaded region of the outsert. The method also may include the step of threadably connecting the arrowhead to the outsert.

In an embodiment, the arrowhead may be threadably connected to the outsert before the outsert is threadably connected to the insert.

In an embodiment, the method may also include the steps of: disconnecting the arrowhead from the outsert; disconnecting the outsert from the insert; threadably connecting a second outsert to the insert, the second outsert having a weight different from the disconnected outsert; and threadably reconnecting the disconnected arrowhead to the second outsert.

In an embodiment, an insert may have a length, a first end, a mid-segment, a neck, a second end, a retainment surface, a major diameter and a minor circumference. The first end having external threads sized to accept the tip of an arrow (arrow head). The tip of the arrow having internal threads, and may be any type head known in the arts, including but not limited too: target points, broad heads, small game heads, judo points, etc. The mid-segment major diameter is sized to the diameter of a decorative sleeve. The neck sized for the engagement of an injection moldable composite within the decorative shaft. The retainment surface having a circumference and a non-radial surface smaller than the circumference of the neck. The retainment surface of the insert engages a moldable composite to prevent unwanted rotation or loosening of the insert. The decorative sleeve having a length, a first end, a second end, an outer surface and in inner surface.

Embodiments of the invention also include a method of manufacturing an arrow. The method may include the steps of providing an injection molding tool, injection moldable composites, and arrow components to manufacture arrows. The injection molding procedure are those known in the art. A cavity is provided in the injection molding tool sufficient for the production of an arrow. The arrow insert component and decorative sleeve component are inserted within the cavity of the injection molding tool. The first end of the decorative sleeve operably engages with the neck of the insert. Moldable composite material is pressurized into the injection molding tool, filling the void between the decorative sleeve, the retainment surface of the insert, and the major diameter of the insert. The moldable composite material bonds with the inner surface of the decorative sleeve and the outer surface of the retainment surface of the insert. The non-radial feature of the retainment surface is critical to the performance and longevity of the arrow. Within the cylinder of the decorative sleeve, the composite material is of a non-uniform thickness retaining the non-radial feature, which prevents rotation of the insert within the decorative sleeve.

An embodiment of the invention may have vanes incorporated with the injection molding process of the arrow.

An embodiment of the invention may have a nock incorporated with the injection molding process of the arrow.

An embodiment of the invention may create a pocket at the rear of the arrow during the injection molding process of the arrow, providing the pocket to receive a nock.

An embodiment of the invention may have an insert for an arrow with a major diameter greater than the diameter of the decorative sleeve.

DETAILED DESCRIPTION OF THE INVENTION

Figure 1:
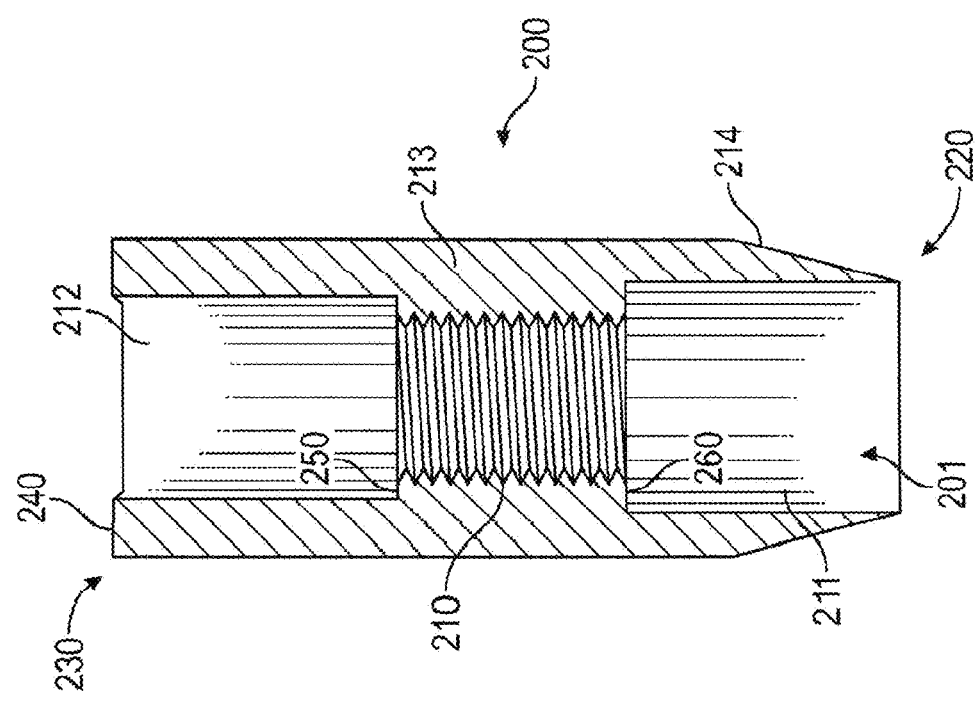
FIG. 1 is a cross-sectional view of an embodiment of an outsert.
Figure 3:
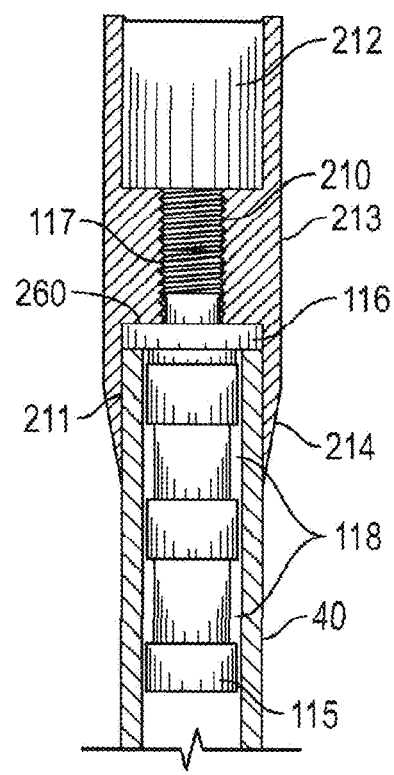
FIG. 3 is a cross-sectional view of an embodiment of an insert/outsert assembly in operative association with an arrow.

With reference to FIGS. 1 and 3, outsert 200 may contain cylindrical wall 213 with center bore 201. Outsert 200 may also include arrow shaft end 220 and arrowhead end 230. At arrow shaft end 220, cylindrical wall 213 may contain tapered section 214. Tapered section 214 may taper inwardly so that the thickness of cylindrical wall 213 gradually thins at arrowhead shaft end 230 to provide a smooth transition between outsert 200 and arrow shaft 40 when outsert 200 is operatively positioned about arrow shaft 40 as seen in FIG. 3. The transition between a constant diameter of cylindrical wall 213 and tapered section 214 may begin at a position that is approximately half the length of arrow shaft chamber 211. Arrow shaft chamber 211 may be formed in the section of center bore 201 that is positioned adjacent the arrow shaft end 220. Arrow shaft chamber 211 may have an inner diameter substantially equal to or slightly greater than that of the outer diameter of arrow shaft 40 to receive arrow shaft 40 in arrow shaft chamber 211. The inner diameter of arrow shaft chamber 211 may vary based on the outer diameter of the mating arrow shaft 40. With the outsert shaft end 220 surrounding the terminating end of arrow shaft 40, outsert 200 (in operative connection with insert 100) provides structural support and additional strength to the terminal end of arrow shaft 40, a traditionally weak point in an arrow. The length of tapered section 214 may vary. In one embodiment, tapered section 214 may have a length of about 0.2 to 1.5 inches or 0.5 to 0.75 inches.

Again with reference to FIGS. 1 and 4, center bore 201 of outsert 200 may include interior top shoulder 250 and interior bottom shoulder 260. In the region of cylindrical wall 213 between interior top and bottom shoulders 250, 260, cylindrical wall 213 is thicker and accommodates interior female threaded region 210. Female threaded region 210 is designed to threadably engage with cooperating male threads of prong 117 of insert 100 and with cooperating male threads of extension member 511 of arrowhead adaptor section 510 of arrowhead 300. In one exemplary embodiment, interior female threaded region 210 may be from about 0.1 inches to 1.5 inches, or from about 0.03 inches to 1.0 inches, or about 0.5 inches in length. Top interior shoulder 250 may be chamfered to accommodate any curvature in arrowhead shoulder 512.

Figure 4:
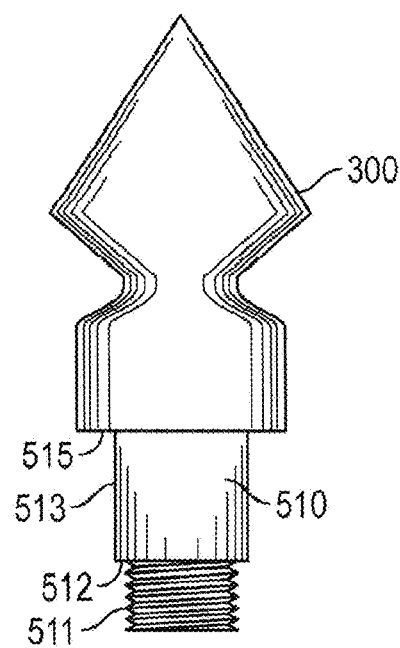
FIG. 4 is a cross-sectional view of an arrowhead.

As seen in FIGS. 1 and 4, arrowhead adapter chamber 212 may be formed in the section of center bore 201 above interior top shoulder 250. Arrowhead adapter chamber 212 may be sized to accommodate smooth cylindrical end 513 of the arrowhead adaptor 510. Top edge 240 of arrowhead adaptor chamber 212 may be chamfered to accommodate any curvature in arrowhead adaptor 510 at or near arrowhead shoulder 515. In exemplary embodiments, the inner diameter of arrowhead chamber 212 may range from 0.20 to inches or from 0.231 to 0.243 inches, or about 0.205 inches.

The length of outsert 200 can vary. Exemplary lengths may be about 1.0 to 2.0 inches or 1.41 inches to 1.62 inches. Extension member 511 of arrowhead adapter section 510 of arrowhead 300 may secured to outsert 200 by threaded connection between the male threads on extension member 511 of arrowhead 300 and the threads on interior female threaded region 210 of outsert 200. Shoulder 512 of arrowhead adapter 510 will contact and seat on interior top shoulder 250 of outsert 200.

The material composition of outsert 200, its overall length and wall thickness, can vary to provide for multiple outserts 200 having different weights. Outserts of differing weights provides the feature of a variable weighted arrow. For example, an archer has the option of changing the weight at the front of arrow 40 to better suit the archery application and to help fine tune arrow 40 for optimum flight characteristics by selecting an outsert 200 of a desired weight. The weight of outsert 200 may range from about 30 to 100 grains or from about 0.068 to 0.228 ounces.

Figure 2:
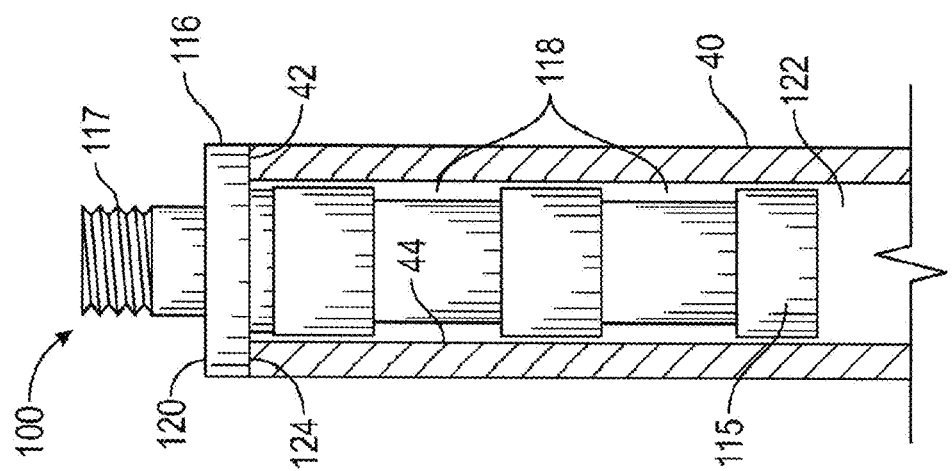
FIG. 2 is a cross-sectional view of an embodiment of an insert in operative association with an arrow.

FIG. 2 depicts an embodiment of insert 100 inserted into a chamber or center bore 122 in arrow shaft 40. Insert 100 may include cylindrical lower body 115 that terminates in a flange, collar or stop 116, above which is upwardly extending male prong 117 containing threads. Prong 117 is positioned on the center axis of insert 100. Prong 117 is sized to threadably engage with interior female threaded region 210 of the outsert 200. Cylindrical lower body 115 of insert 100 may have one or more grooves, slots, or pockets 118, such as the circumferential pockets 118 shown in FIG. 2, or other surface variations to accommodate glue or adhesive. When threadably connected with outsert 200, the upper edge 120 of insert stop 116 may seat against interior bottom shoulder 260 of outsert 200. The length of insert 100 may vary. In an exemplary embodiment, the length of insert 100 may be from about 1.0 to 2.0 inches or about 1.5 inches. The outer diameter of insert 100 at lower body end 115 may be from about 1.0 to 2.0 inches or about 1.65 inches.

Both insert 100 and outsert 200 may be made of high carbon steel, stainless steel, or other metal alloy, such as aluminum or magnesium.

FIG. 3 shows insert 100 an outsert 200 (or the insert/outsert assembly) installed to arrow shaft 40. To assemble the insert/outsert assembly within arrow shaft 40, insert 100 is fixed in center bore 122 of the arrow shaft 40. Bottom edge 124 of insert stop 116 contacts terminal end 42 of the arrow shaft 40. Insert 100 may be fixed within center bore 122 by contact of the outer surface of lower cylindrical body 115 with the inner surface of bore wall 44 of arrow shaft 40. Alternatively, the outer surface of lower cylindrical body 115 of insert 100 may be glued to bore wall 44. The glue may be placed within pockets 118. Outsert 200 is then threadably connected to insert 100 by mating the female threads of interior female threaded region 210 to the male threads of prong 117 until top edge 120 of insert stop 116 contacts shoulder 260. Arrowhead 300 may now be threadably connected to outsert 200 by mating the male threads of extension member 511 to the female threads of interior female threaded region 210. Alternatively, arrowhead 300 could be first threaded connected to outsert 200 and then the assembly of the arrowhead 40 and outsert 200 threaded connected to insert 100 as described above.

The insert/outsert assembly allows for ease of assembly, strengthens the tip of arrow shaft 40, and provides the ability to change tip weights and tip configurations without removing the glued insert from arrow shaft 40, thus avoiding damaging the arrow shaft.

Additionally, the system also allows an archer to disassemble outsert 200 from insert 100 so that insert 100 may be used as a means to directly connect with an arrowhead that is modified to threadably connect with prong 117 of insert 100. For example, arrowhead 300 may be modified to remove arrowhead adapter section 510, which is replaced with a female adapter capable of threadably connecting to prong 117 of insert 100.

Figure 5:
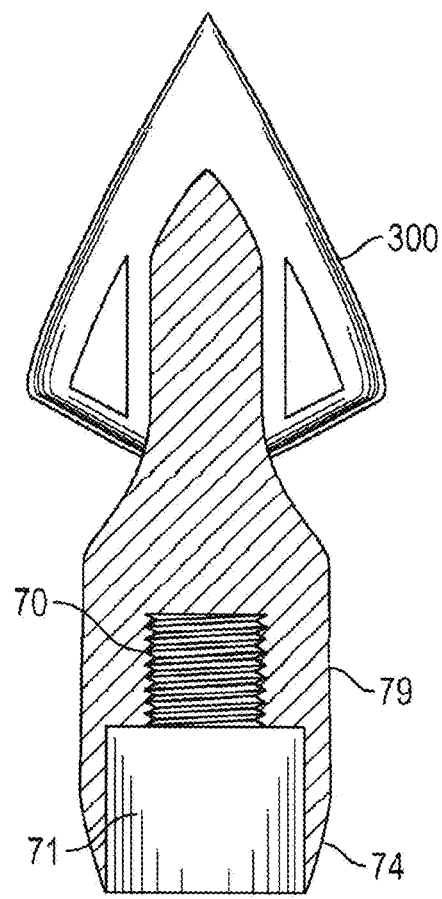
FIG. 5 is a cross-sectional view of an embodiment of an arrowhead in the form of a broad head that may be used with the insert shown in FIG. 2.

With reference to FIG. 5, broad head 300 is configured with bottom wall section 79 that contains interior bore 71 that terminates in female threaded region section 70. Bottom wall section 79 may contain tapered section 74 similar in design and function as described above in connection with tapered section 214 of outsert 200. Female threaded region section 70 is threadably connected to the male threads of prong 117 to directly connect arrowhead 300 to insert 100.

Figure 6:
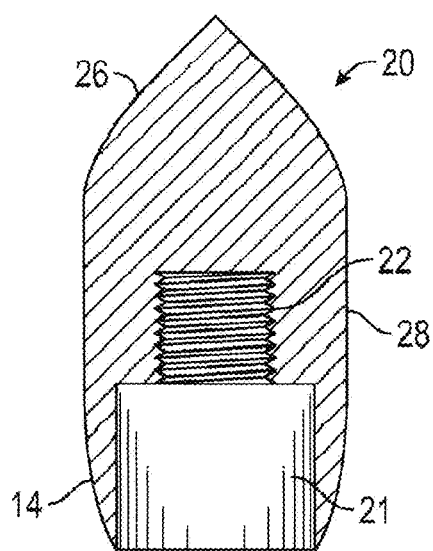
FIG. 6 is a cross-sectional view of an embodiment of an arrowhead in the form of a practice point that may be used with the insert shown in FIG. 2.

With reference to FIG. 6, practice point 20 is configured with bottom wall section 28 that contains interior bore 21 that terminates in female threaded region section 22. Bottom wall section 28 may contain tapered section 14 similar in design and function as described above in connection with tapered section 214 of outsert 200. Female threaded region section 22 is threadably connected to the male threads of prong 117 to directly connect practice point 20 to insert 100.

Figure 7:
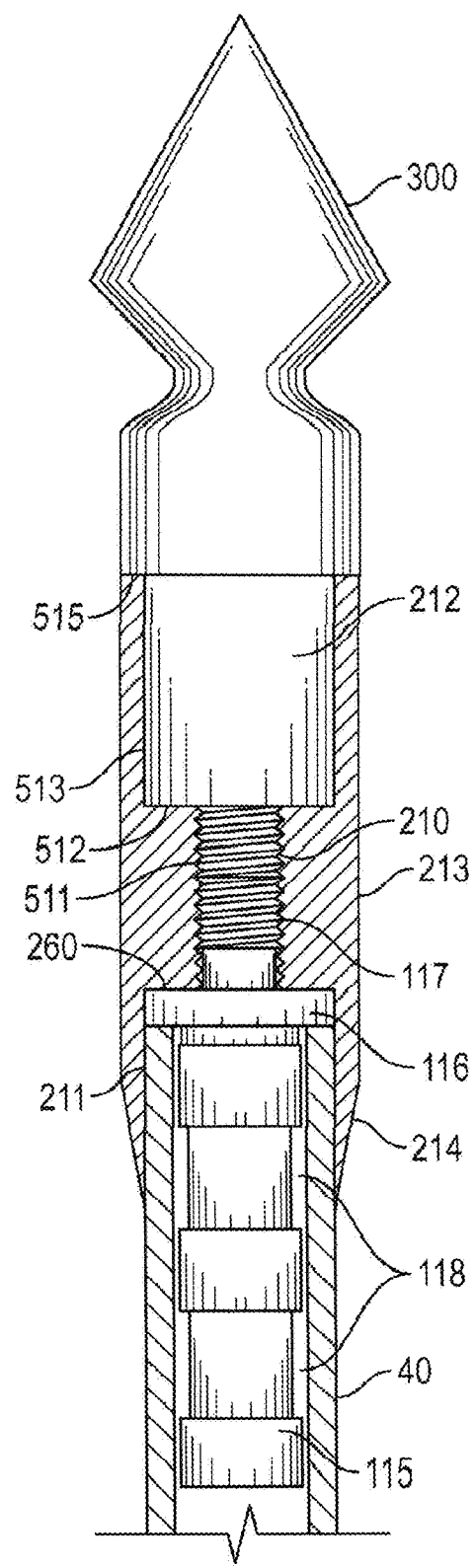
FIG. 7 is a cross-sectional view of an embodiment of an arrowhead operatively associated with an embodiment of an insert/outsert assembly in operative position on an arrow.
Figure 8:
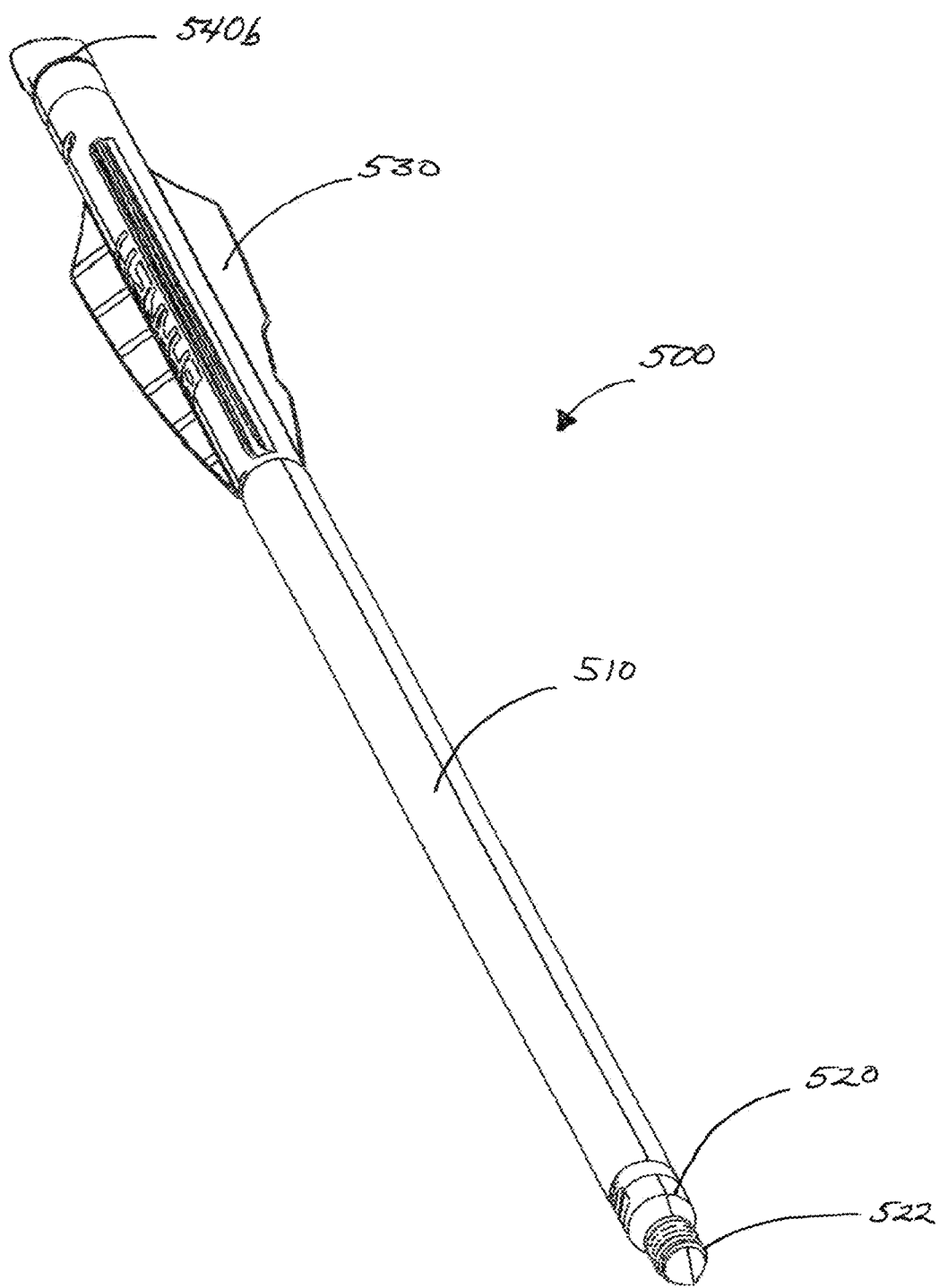
FIG. 8 is a perspective view of an embodiment of the invention proving an arrow having a decorative sleeve, an insert having external threads, and an injection molded arrow body including vanes.
Figure 9:
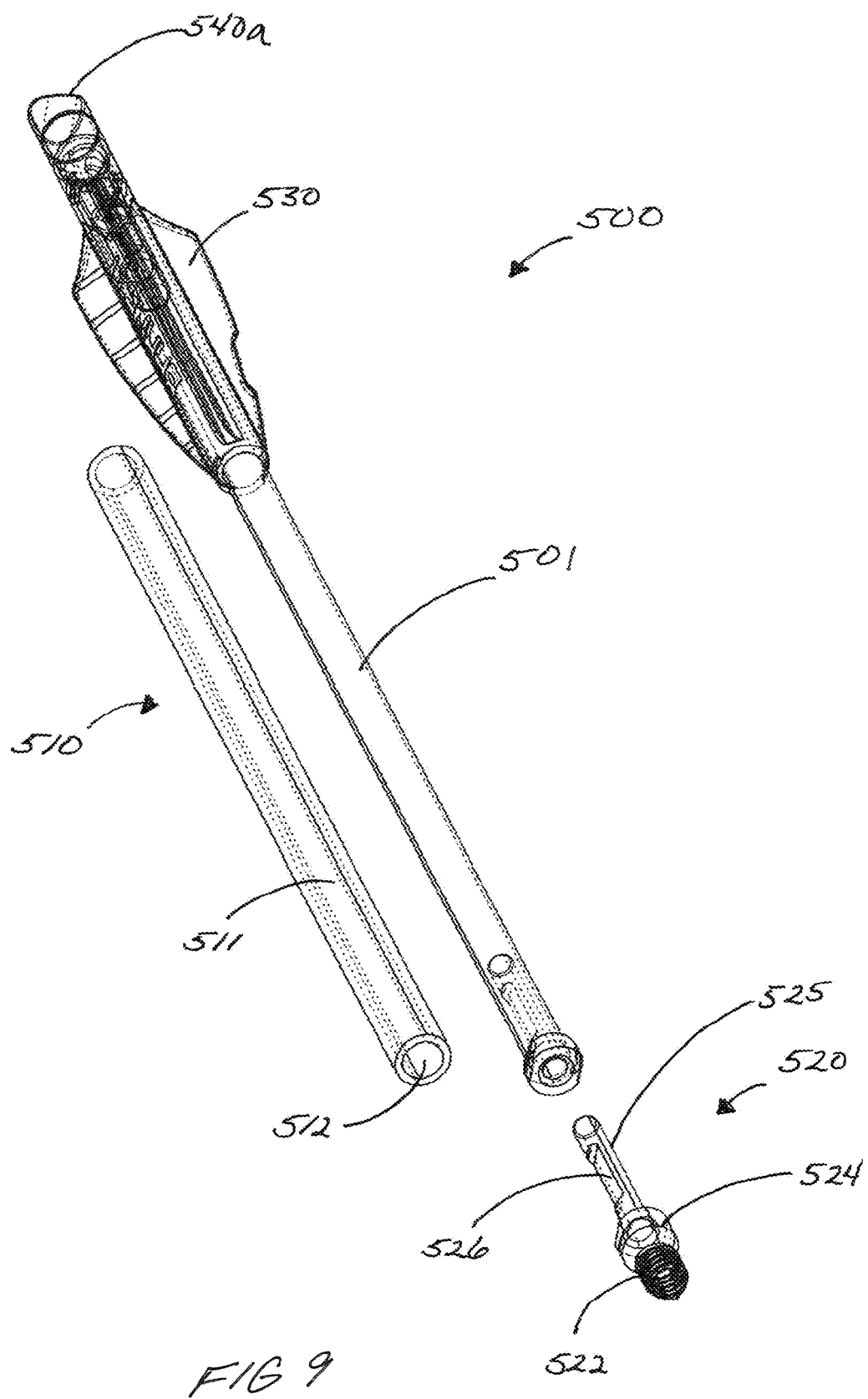
FIG. 9 is an exploded view of the components of an embodiment of the invention proving an arrow having a decorative sleeve, an insert having external threads, and an injection molded arrow body including vanes.
Figure 10:
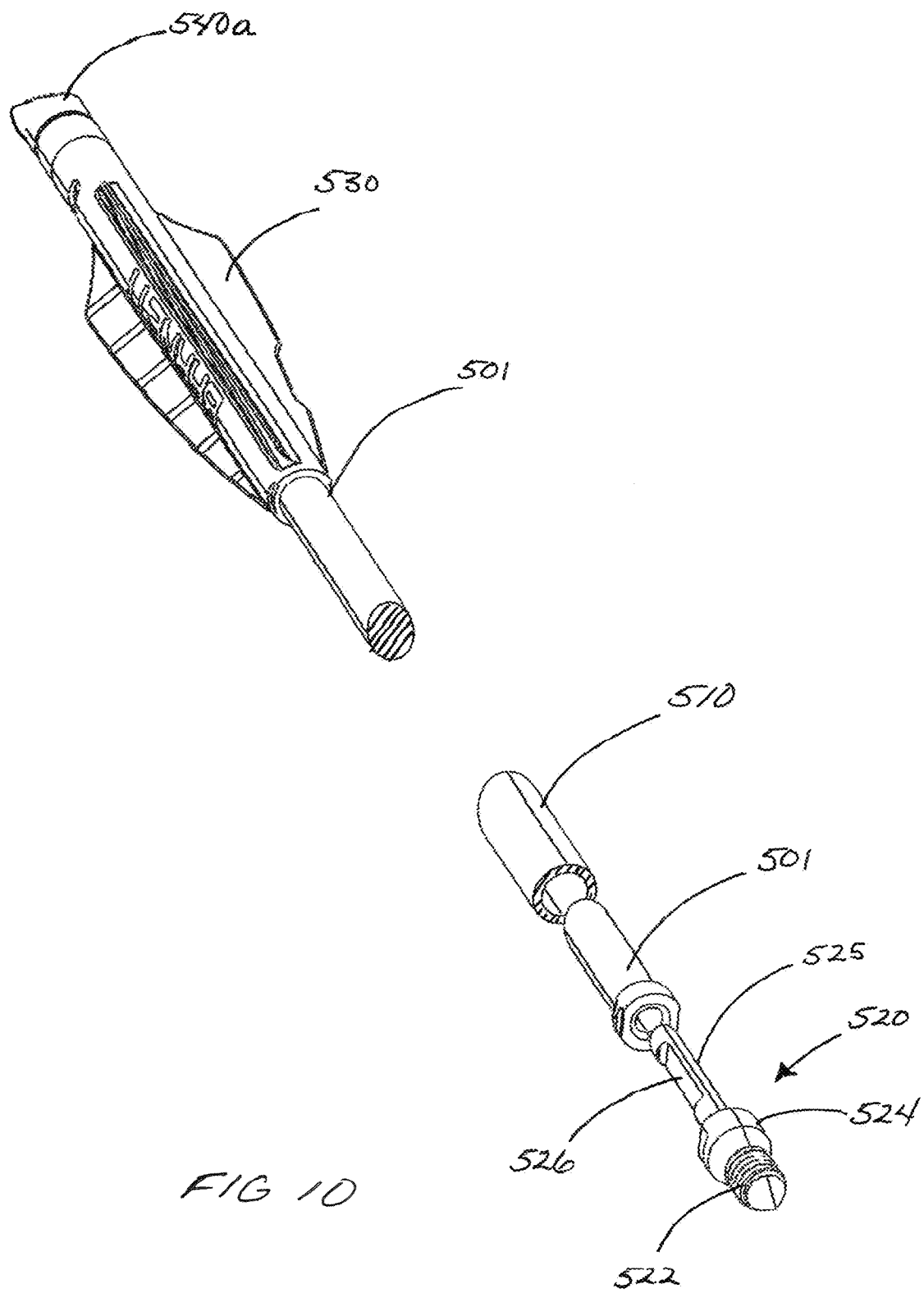
FIG. 10 is an exploded cutaway view of the components of an embodiment of the invention proving an arrow having a decorative sleeve, an insert having external threads, and an injection molded arrow body including vanes.
Figure 11:
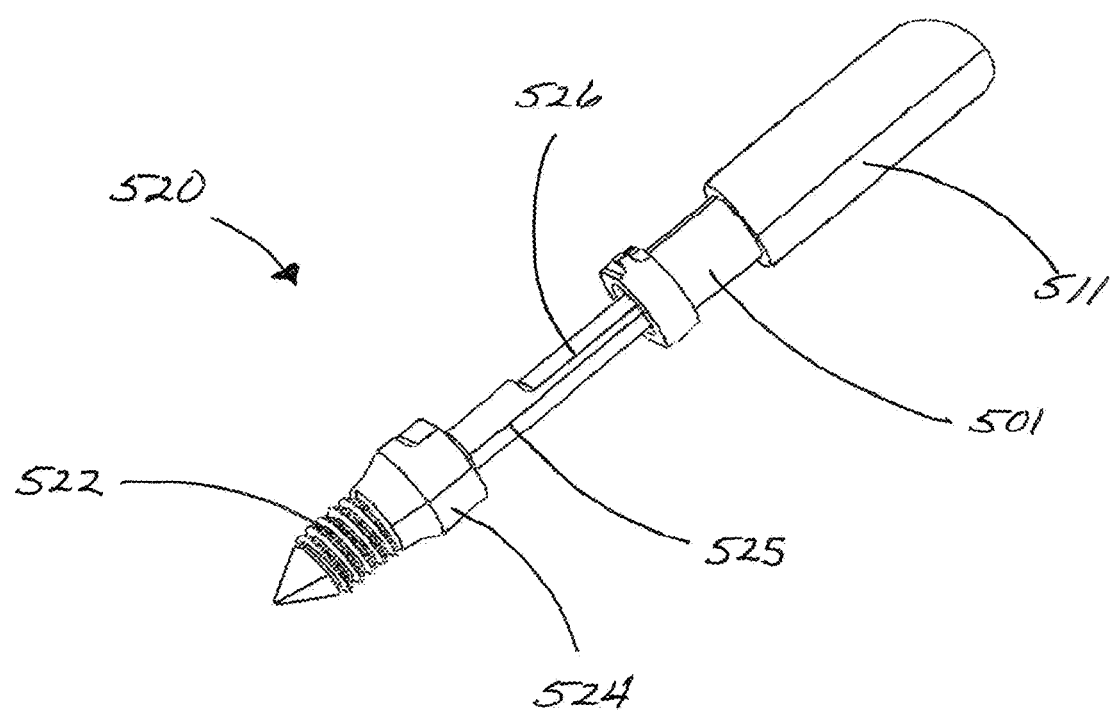
FIG. 11 is a partial exploded cutaway view of the components of an embodiment of the invention proving an arrow having a decorative sleeve, an insert having external threads, and an injection molded arrow body including vanes.
Figure 12:
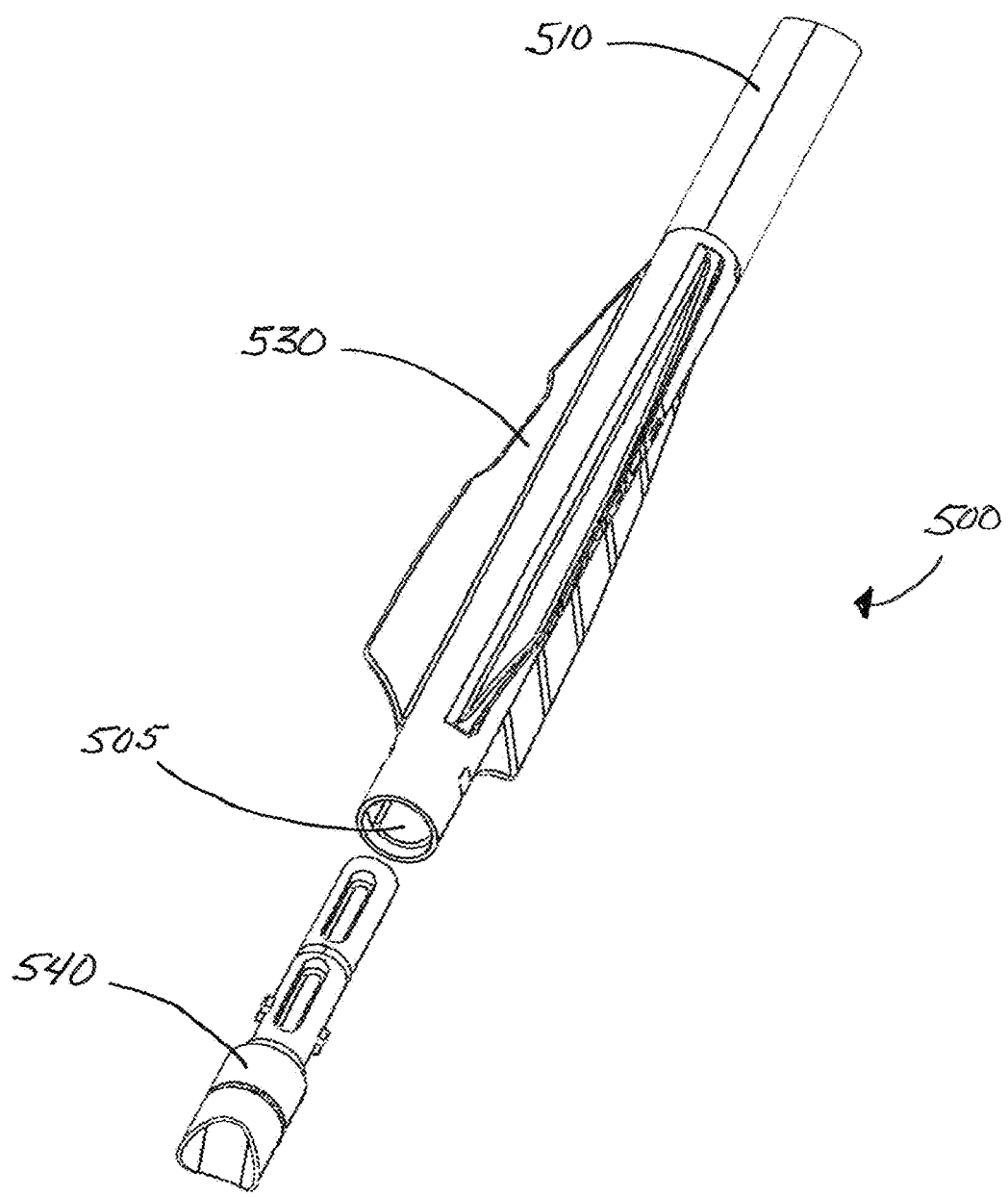
FIG. 12 is a partial exploded view of an embodiment of the invention.

FIG. 7 shows insert/outsert assembly operatively positioned within arrow shaft 40 with arrowhead 300 operatively connected to the insert/outsert assembly as described above.

FIGS. 8-11 show an embodiment, an insert 520 may have a length, a first end, a mid-segment, a neck, a second end, a retainment surface 526, a major diameter 524 and a minor circumference. The first end having external threads 522 sized to accept the tip 20 or broad head 300 (arrow head) of an arrow 500. The arrow head having internal threads, and may be any type head known in the arts, including but not limited too: target points, broad heads, small game heads, judo points, etc. The mid-segment major diameter 524 is sized to the outer diameter 511 of a decorative sleeve 510. The neck 525 sized for the engagement of an injection moldable composite 501 within the decorative shaft 510. The retainment surface 526 having a circumference and a non-radial surface smaller than the circumference of the neck 525. The retainment surface 526 of the insert 520 engages a moldable composite 501 to prevent unwanted rotation or loosening of the insert 520. The decorative sleeve 510 having a length, a first end, a second end, an outer surface 511 and in inner surface 512.

Embodiments of the invention also include a method of manufacturing an arrow 500. The method may include the steps of providing an injection molding tool, injection moldable composites 501, and arrow components to manufacture arrows. The injection molding procedure are those known in the art. A cavity is provided in the injection molding tool sufficient for the production of an arrow 500. The arrow insert component 520 and decorative sleeve component 510 are inserted within the cavity of the injection molding tool. The first end of the decorative sleeve 510 proximal the neck 525 of the insert 520. Moldable composite material 501 is pressurized into the injection molding tool, filling the void between the decorative sleeve 510, the retainment surface 526 of the insert 520, and the major diameter 524 of the insert 520. The moldable composite material 501 bonds with the inner surface 512 of the decorative sleeve 510 and the retainment surface 526 of the insert 520. The non-radial feature of the retainment surface 526 is critical to the performance and longevity of the arrow 500. Within the cylinder of the decorative sleeve 510, the composite material 501 is of a non-uniform thickness retaining the non-radial feature of the retainment surface 526, which prevents rotation of the insert 520 within the decorative sleeve 510. The injection molding process eliminates internal enclosed cavities within the arrow 500.

An embodiment of the invention may have vanes incorporated 530 with the injection molding process of the arrow 500.

An embodiment of the invention may have a nock 540*b* incorporated with the injection molding process of the arrow 500.

An embodiment of the invention may create a pocket 505 at the rear of the arrow 500 during the injection molding process of the arrow 500, providing the pocket 505 to receive a nock 540.

An embodiment of the invention may have an insert 520 for an arrow 500 with a major diameter 524 greater than the outer diameter 511 of the decorative sleeve 510.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the example and descriptions set forth herein, but rather that the claims be construed as encompassing all the features of patentable novelty which reside herein, including all features which would be treated as equivalents thereof by those skilled in the art to which this disclosure pertains

I claim:

1. An arrow comprising:
an insert;
a decorative shaft; and
an injection molded body; said insert having a length with a frontal segment, a mid-segment, and a rear segment, the frontal segment having external threads, the mid segment having a circumference, and the rear segment having a retaining surface circumference smaller than the circumference of the mid segment; said decorative sleeve having an inner surface and an outer surface; said injection molded body integrated with said insert and said decorative shaft; wherein said insert, decorative shaft, and injection molded body are integrated having no internal enclosed cavity.

2. The arrow of claim 1 wherein:
said external threads are sized to engage internal threads of an arrow head.

3. The arrow of claim 1 wherein:
vanes are integrated with the arrow.

4. The arrow of claim 1 wherein:
a nock is one of integrated and non-integrated with the arrow.

* * * * *